Sept. 10, 1957   H. M. JACKLIN   2,805,654
OPPOSED PISTON TWO CYCLE ENGINE
Filed Oct. 6, 1950   2 Sheets-Sheet 2
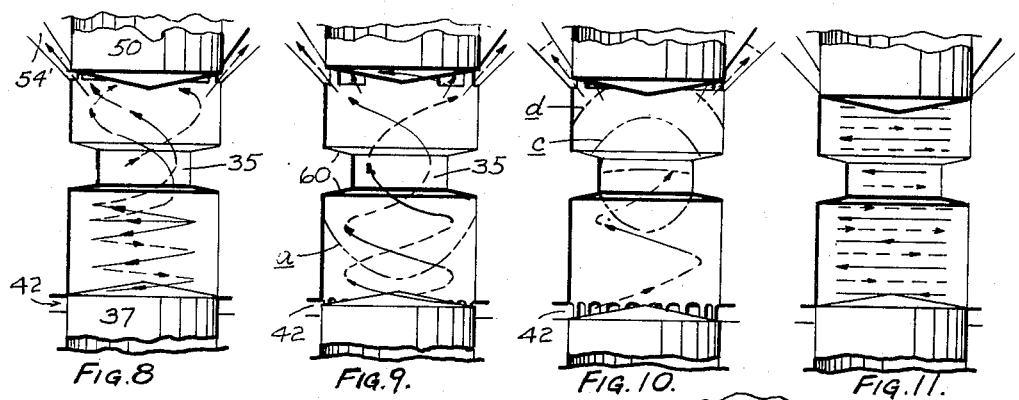
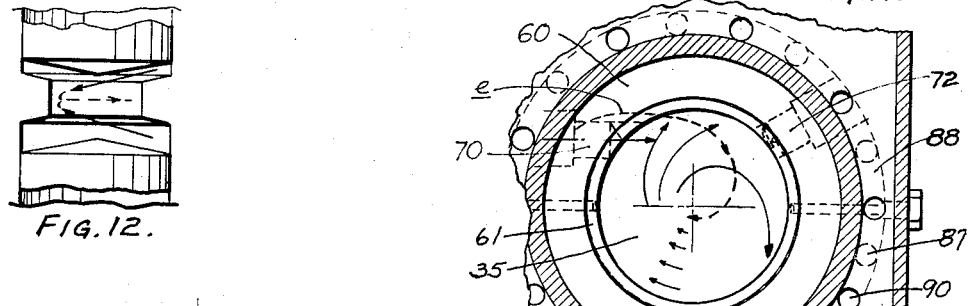
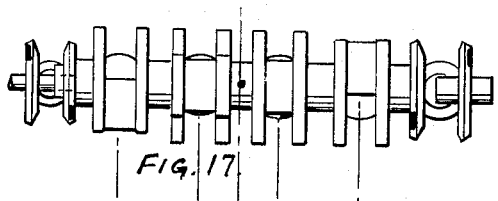
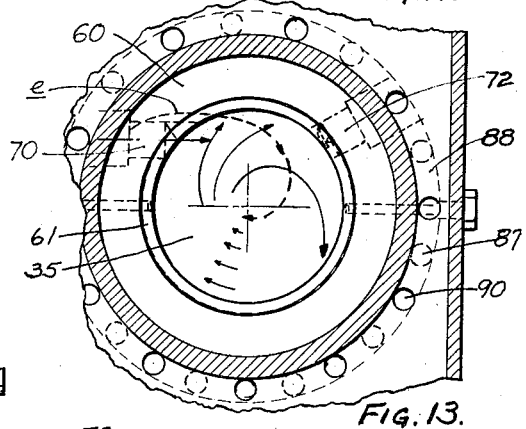
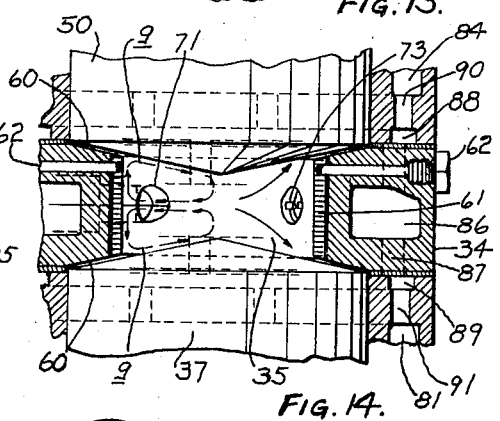
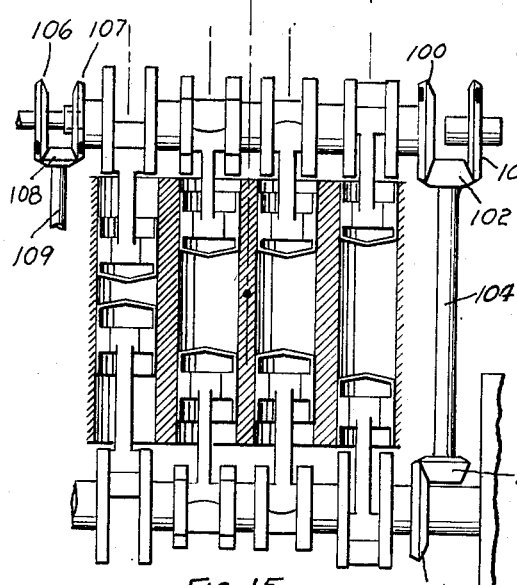
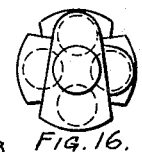
INVENTOR.
HAROLD M. JACKLIN.
BY
ATTORNEYS

United States Patent Office 2,805,654
Patented Sept. 10, 1957

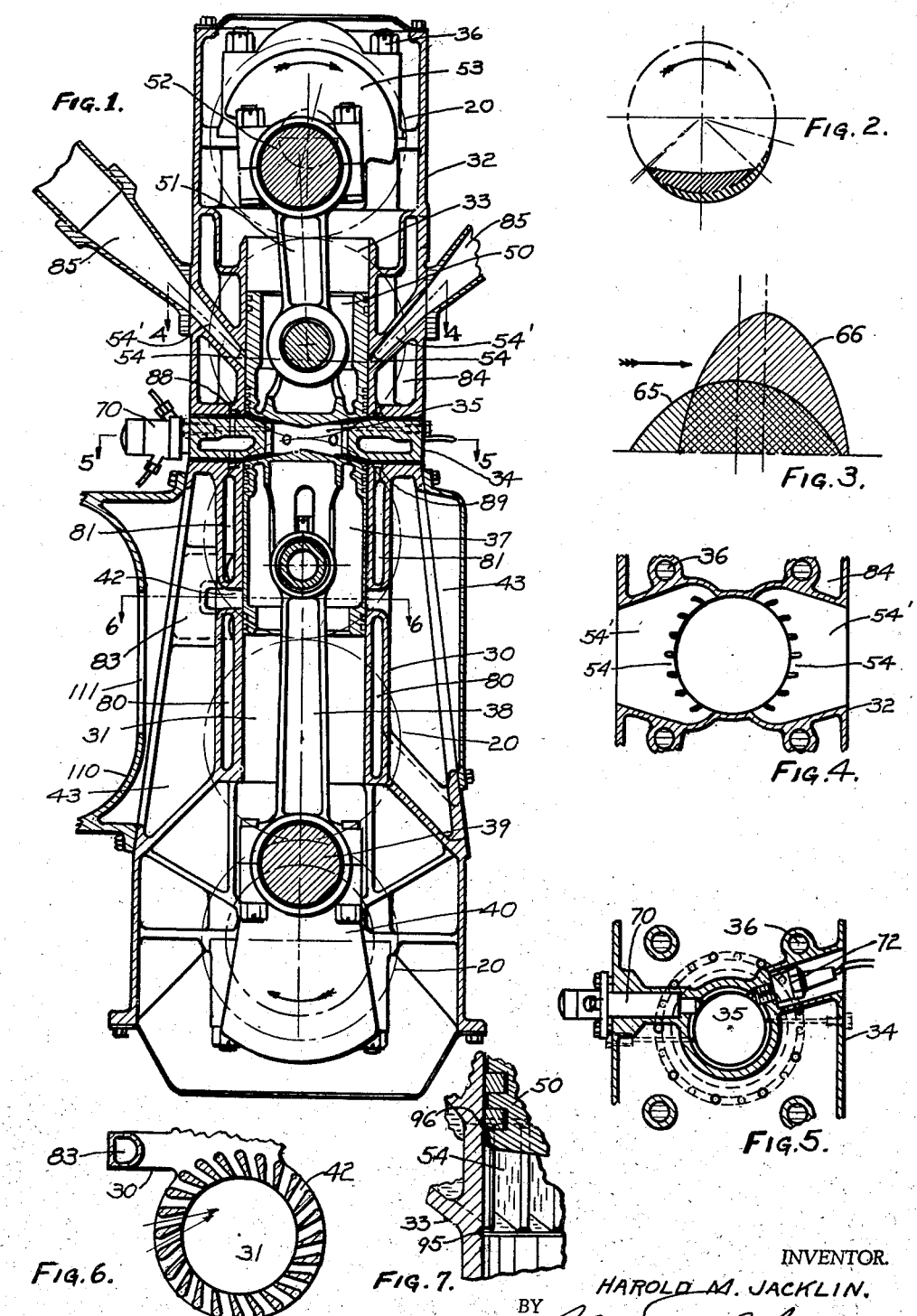

2,805,654

OPPOSED PISTON TWO CYCLE ENGINE

Harold M. Jacklin, Indianapolis, Ind.

Application October 6, 1950, Serial No. 188,810

3 Claims. (Cl. 123—51)

This invention relates to two-cycle engines and more particularly to engines employing uniflow scavenging and embodying two pistons in each cylinder. In such an engine, the two pistons in each cylinder reciprocate oppositively, one uncovering exhaust ports and the other uncovering inlet ports as the outer ends of the respective strokes are approached.

Objects of my invention are to obtain more effective scavenging and to improve combustion in an engine of the type indicated, to make better use of the cylinder by reducing the time required to replace the products of combustion with the incoming charge, to increase compactness and reduce weight, to facilitate the employment of supercharging, and to provide an effective control of combustion-chamber temperature; all to the end of simplifying construction, reducing manufacturing cost, and promoting economy of operation. A further object of my invention is to improve the cooling of liquid-jacketed engine cylinders, especially at joints in such cylinders. Still another object of my invention is to produce a simple and effective harmonic balancer for balancing the reciprocating masses in an opposed-piston engine in which the piston strokes are of different lengths.

In carrying out the invention, each cylinder is provided with a pair of opposed pistons, hereinafter referred to respectively as the inlet and exhaust pistons. The combustion chamber, which is located in the cylinder between the two pistons, is of materially smaller diameter than the cylinder. Such combustion chamber is provided with a sleeve-like liner which fits the reduced diameter portion of the cylinder loosely to provide for a low rate of heat-transmission when the engine is cold. The inlet ports, which are uncovered by the inlet piston near the outer end of its stroke, are arranged generally tangentially to the cylinder so that the incoming charge will tend to rotate about the cylinder axis to create in the contents of the cylinder a swirl which, as is more fully brought out hereinafter, exists throughout the entire cycle.

Centrifugal forces resulting from the swirling action tend to concentrate the incoming charge adjacent the periphery of the cylinder and the products of combustion adjacent the cylinder-axis. The exhaust piston preferably has a materially shorter stroke than the inlet piston, with the result that the products of combustion forced through the combustion chamber by the incoming charge have a comparatively short distance to travel before reaching the exhaust ports uncovered by the exhaust piston as it nears the outer end of its stroke.

Preferably, the engine comprises a lower block containing the inlet end of each cylinder, an upper block containing the exhaust end of the cylinder, and an interposed head in which the combustion chamber is provided. If the engine is to be liquid-cooled, the two blocks and the head are liquid-jacketed to provide for the circulation of a suitable liquid coolant. To increase the effectiveness of coolant in the heavy section of the cylinder adjacent the joint between the head and each cylinder block, the jacket of the head communicates with the jacket of each cylinder through passages provided by circumferentially extending grooves in the head-abutting faces of the cylinders.

The accompanying drawings illustrate the invention: Fig. 1 is a transverse section through an engine on the center line of one cylinder; Figs. 2 and 3 are diagrams illustrating port openings; Fig. 4 is a transverse section through the exhaust ports on the line 4—4 of Fig. 1; Fig. 5 is a transverse section through the combustion chamber on the line 5—5 of Fig. 1; Fig. 6 is a transverse section through the inlet ports on the line 6—6 of Fig. 1; Fig. 7 is a fragmental view similar to Fig. 1, but on an enlarged scale; Figs. 8 to 12 inclusive are diagrammatic axial sections illustrating piston positions and gas motion in various stages in the cycle; Fig. 13 is a transverse section through the inlet end of the cylinder illustrating the combustion chamber in plan; Fig. 14 is a fragmental section similar to Fig. 1, but on an enlarged scale to illustrate more effectively the details of the combustion chamber; Fig. 15 is a somewhat diagrammatic longitudinal section through a four-cylinder engine illustrating a harmonic balancing means; Fig. 16 is an end elevation of the crank-shaft illustrated in Fig. 16; and Fig. 17 is a top plan view of the engine illustrated in Fig. 15.

The engine shown in Fig. 1 embodies a lower block 30 having one or more inlet cylinders 31, an upper block 32 having a corresponding number of exhaust cylinders 33, and a head 34 which is interposed between the two blocks and which is provided with a combustion chamber 35 in line with each pair of inlet and exhaust cylinders. Any appropriate form of means, such as the through-bolts 36, may be used to hold the two blocks and the head in assembled relationship. Each inlet cylinder 31 contains an inlet piston 37 connected by a connecting rod 38 to a crank 39 of a lower crank shaft 40. In a position to be uncovered by the head of the piston 37 as it nears the outer end of its stroke, the cylinder 31 is provided with inlet ports 42 which communicate with an air box 43 and which, as will be clear from Fig. 6, are directed tangentially so that the gases entering the cylinder through them will create a circular motion within the cylinder.

Each exhaust cylinder 33 is aligned with and conveniently of the same diameter as an inlet cylinder 31 and contains a reciprocable piston 50 connected through a connecting rod 51 with a crank pin 52 of an upper crank shaft 53. The stroke of the upper piston 50 is considerably less than that of the lower piston, preferably being about one-third to one-half of the stroke of the lower piston. In a position to be uncovered by the piston 50 as it nears the outer end of its stroke, the cylinder 33 is provided with an annular series of exhaust ports 54 the axes of which desirably are inclined outwardly of the cylinder in both radial and axial senses.

The combustion chamber 35 in the head 34 is of smaller diameter than the cylinders 31 and 33 to provide annular shoulders 60 (see Fig. 14) which are closely approached by the pistons 37 and 50 at the inner ends of their strokes. Preferably, the inner end faces of the pistons are conical, and the shoulders 60 are complementarily shaped. For a purpose which will become apparent hereinafter, the combustion chamber 35 is provided with a sleeve-like liner 61 which, when cold, is of slightly smaller diameter than the opening in the head which receives it. Such liner may be held in place against both axial and rotational movement by radially extending pins 62 which are removably mounted in the head 34 and project into openings in the liner 61.

In the particular engine illustrated in the drawing, which is of the fuel-injection type, the head 34 is provided at each combustion chamber with a fuel-injector 70 adapted to discharge into the associated combustion chamber 35 through an appropriately positioned opening 71 in the liner 61. Desirably the injector 70 is so oriented that it discharges chordally into the combustion chamber toward an ignition device 72 which is mounted in the block 30 and exposed through an opening 73 in the liner 61.

Fig. 1 illustrates the positions of the pistons 37 and 50 near the inner ends of their strokes a short interval after the occurrence of the explosion. As the pistons are driven outwardly under the influence of the expanding gases, the two crank shafts 40 and 53 rotate in the clockwise direction, as indicated by the arrows in Fig. 1, expansion of the gases continuing until the exhaust piston 50 uncovers the exhaust ports 54. Shortly after the exhaust ports are uncovered, the inlet piston 37 uncovers the inlet ports 42 to admit the new charge. Such charge flows generally upwardly in the cylinders and, forcing the products of combustion ahead of it, produces the necessary scavenging action. As rotation of the crank shafts continues, the exhaust ports close in the inward movement of the exhaust piston 50 and, shortly thereafter, the inlet ports 42 are closed by inward movement of the inlet piston 37. Compression and the next explosion follow.

As so far described, the operation of the engine is not new, the novel features of my invention arising from the tangential disposition of the inlet ports 42 and from the presence of the reduced-diameter combustion chamber 35 between the two cylinders 31 and 33. To understand the effect of these provisions, reference may be had to Figs. 8 to 12. Fig. 8 illustrates the piston-positions as the inlet ports 42 are about to open, the exhaust ports 54 being already opened and discharge of the products of combustion through the ports having begun. Fig. 9 illustrates the piston-positions after the inlet ports 42 have begun to open. Fig. 10 shows the inlet ports 42 fully opened and the exhaust ports 54 as beginning to close. Fig. 11 indicates the condition when both inlet and exhaust ports are closed and the compression stroke has started. Fig. 12 shows the condition existing as the pistons are near the inner ends of their respective strokes.

Because of the tangential disposition of the inlet ports 42, the incoming charge causes a rotation of the gases in the cylinders. As the incoming charge is much cooler and therefore denser than the products of combustion, the circular motion of the gases within the cylinder causes the denser incoming charge to seek the cylinder wall under the influence of centrifugal forces. While there will inevitably be some mixing of the incoming charge with the products of combustion, it may be assumed for purposes of explanation that there is no such mixing and that there is a boundary surface separating the incoming charge from the products of combustion. Because of the effect of centrifugal forces and the differences in density, such boundary surface will possess a generally paraboloid form, as indicated at $a$ in Fig. 9. As the new charge continues to enter through the inlet ports while the products of combustion escape through the exhaust ports, the flow within the cylinders will be axially upward as well as circular, as indicated by the arrows in Fig. 9. In the upward displacement of the gases, the periphery of the boundary surface will reach the lower shoulder 60 before the apex of the surface attains that elevation, with the result that the incoming charge will, in effect, displace the products of combustion inwardly, as well as axially, into the combustion chamber 35. As the incoming charge emerges from the combustion chamber 35, it expands radially as well as axially and forces the products of combustion ahead of it and outwardly through the exhaust ports 54.

Experiments have established that the scavenging efficiency is greatly increased by the reduced-diameter combustion chamber. As will be obvious from Fig. 9, in the absence of the constriction afforded by the combustion chamber 35 the boundary surface $a$ would progress upwardly in the cylinder without significant distortion and its periphery would reach the exhaust ports 54 at a time when a large body of burnt gases remained in the cylinder. In consequence, a large proportion of the incoming charge would escape through the exhaust ports before scavenging could be completed. With the small-diameter combustion chamber present, however, the flow of incoming charge axially along the cylinder wall is interrupted by the shoulder 60 below the combustion chamber with the result that substantially all the products of combustion enter and flow through the combustion chamber in advance of the incoming charge. The incoming charge enters the upper end of the cylinder near the center thereof and hence tends to displace the products of combustion in the upper portion of the cylinder radially outwardly toward the exhaust ports 54 as well as axially of the ports.

By the time the incoming charge enters the combustion chamber 35 some of its angular momentum about the cylinder axis has been lost, and its density has been decreased as the result of its contact with the hot walls of the cylinder and combustion chamber. Accordingly, the effect of centrifugal force in tending to cause segregation of the incoming charge from the products of combustion is substantially reduced. Moreover, the momentum of the charge emerging from the combustion chamber into the upper portion of the cylinder favors axial flow rather than radial expansion. All these factors contribute toward an inversion of the boundary surface, successive positions of which within the upper portion of the cylinder are indicated at $c$ and $d$ in Fig. 10. The comparative short length of the upper cylinder portion, which preferably is considerably less than the cylinder diameter, contributes to preservation of the inverted form of the boundary surface and hence promotes scavenging.

The angular momentum of the gases about the cylinder axis persists after the inlet and exhaust ports have both been closed, creating the condition indicated by the arrows in Fig. 11, where the horizontal disposition of the flow-indicating arrows has been employed to indicate that over-all axial flow of gases in the cylinder terminated with the closing of the exhaust and inlet ports. As the compression stroke proceeds, more and more of the whirling gases are forced into the combustion chamber 35, as indicated in Fig. 12. Because of the small diameter of the combustion chamber and the tendency of the gases to preserve their momentum, gases displaced from the cylinder into the combustion chamber undergo an increase in angular velocity.

As the pistons approach the shoulders 60 at the inner ends of their strokes, a condition is created which further modifies gas flow within the combustion chamber. The cylinders approach the shoulder 60 rather closely, and the gases in the annular spaces above and below such shoulders are displaced inwardly along the piston heads with a very considerable radial component of velocity, as indicated by broken line $e$ in Fig. 13, thus tending to create within the combustion chamber a flow of gases such as is indicated by the arrows $g$ in Fig. 14. Since the gases retain their rotational velocity about the cylinder axis, the result is that each gas particle follows a path resembling a toroidal coil and all particles pass through the fuel spray in the short period during which combustion occurs.

The injection nozzle 70 is shown as located midway of the height of the combustion chamber at an elevation where the radial flow of gases is generally outward, and there will consequently exist a tendency for the spray or jet of fuel to be carried outwardly toward the periphery wall of the combustion chamber. The nozzle 70 should be oriented about the vertical with due consideration taken of such tendency, so that the fuel will be distributed radially with satisfactory uniformity.

Upon ignition, which may occur either as the result of the temperature rise incident to compression or by operation of the ignitor 72, the pistons are driven outwardly in the power stroke. It will be understood, of course, that the two crank shafts 40 and 53 are interconnected, as by gearing 20 (Fig. 1), for rotation at the same speeds.

A satisfactory timing arrangement is illustrated diagrammatically in Figs. 2 and 3. In Fig. 2, a polar diagram showing the position of valve events with respect to rotation of the main crankcraft, exhaust-port opening is represented by the relatively thin outer shaded crescent while inlet-port opening is indicated by the relatively thick inner shaded crescent. Duration of port-opening is indicated by the angular extent and port area by the radial extent of each crescent. Fig. 3 is a development indicating the transfer-event alone, abscissas representing crank-shaft rotation and ordinates representing the extent of port opening. In Fig. 3, the lower curve 65 represents the opening of the exhaust ports while the upper curve 66 represents the opening of the inlet ports. Desirably, the crank shafts 40 and 53 are so phased that the exhaust piston 50 possesses a lead over the inlet piston 37, as is represented by the horizontal displacement of the crests of the two curves 65 and 66 in Fig. 3. As will be further apparent in Fig. 3, the duration of exhaust-port opening is preferably greater than the duration of inlet-port opening, the excess being insufficient, however, to cause the inlet ports to close prior to the exhaust ports.

It will be understood that the timing of valve events will depend upon a number of factors peculiar to the individual engine and to the results desired from it. Data for one particular engine follow:

| | |
|---|---|
| Bore (of both cylinders) | 4.25". |
| Stroke of inlet piston | 5.00". |
| Stroke of exhaust piston | 2.00". |
| Diameter of combustion chamber | 2.50". |
| Length of combustion chamber | 1.25". |
| Lead of upper crankshaft over lower crankshaft | 15°. |
| Exhaust opening | 74° before O. D. C. |
| Exhaust closing | 44° after O. D. C. |
| Inlet opening | 48° before O. D. C. |
| Inlet closing | 48° after O. D. C. |

In the above table, all valve events are referred to outer dead center of the inlet (main) piston 37.

The upper and lower cylinders and the head 34 are provided with intercommunicating water jackets through which the water or other coolant successively circulates. As shown in the drawing, the water jacket for the lower cylinder is in two sections 80 and 81 lying respectively below and above the inlet ports 42, the two sections being interconnected as by a conduit 83 bridging the ports. The upper cylinder has an axially continuous coolant-receiving space 84 across which exhaust passages 54' (Figs. 1 and 4) extend to connect with exhaust conduits 85. The head 34 (Figs. 1, 13, and 14) has an annular coolant chamber 86 communicating with ports 87 which open into the upper and lower faces of the head in position to communicate with annular grooves 88 and 89 provided respectively in the lower face of the upper cylinder block 32 and in the upper face of the lower cylinder block 30. Ports 90 in the upper cylinder block provide communication between the coolant receiving space 84 and groove 88, while ports 91 provide communication between the upper jacket section 81 of the lower cylinder and the annular groove 89. The ports 87 are angularly displaced from the ports 90 and 91 so that the coolant leaving each port 91 in the lower cylinder block will be compelled to flow circumferentially for a distance along the groove 89 before entering a lower port 87 of the head. Similarly, coolant leaving each upper port 87 of the head must flow circumferentially for a distance along the groove 88 before entering a port 90 and passing upwardly through the jacket of the upper cylinder. The ports 90 and 91, which are desirably drilled, are equally spaced about the cylinder-axis; and the circumferential flow of liquid in contact with the end faces of the cylinder barrels aids very materially in cooling the inner ends of the cylinder barrels to promote improved lubrication and reduce wear thereat and maintains the head at a lower temperature than would otherwise be possible.

Reference has heretofore been made to the combustion-chamber liner 61 and to its normal loose fit within the head 34. When the engine is first started, the loose fit of the liner 61 within the head 34 retards the transfer of the heat from the liner to the head, with the result that the liner warms up quickly. As liner-temperature increases, the liner expands, the fit between it and the head 34 becomes tighter, and heat transfer from the liner to the head becomes more rapid. Thus, under starting conditions when the engine is cool, the temperature of the liner increases quickly and promotes satisfactory combustion. At the same time, the liner is prevented from becoming overheated as the engine continues in operation, because any tendency to overheat increases the tightness of its fit within the head 34 and thereby increases the rate of heat transfer to the cooled head.

Referring to Fig. 7 it will be apparent that the upper, or exhaust, cylinder 33 is provided in its inner surface with machined, annular grooves 95 and 96 co-incident respectively with lower and upper edges of the ports 54. The ports 54 will normally be formed by cores in the casting of the upper cylinder block; and as it is difficult to control accurately the dimensions and positions of such cores, there is a possibility that the lower edges of the exhaust ports 54 will not all lie in the same plane. In that event, the ports would not open simultaneously in upward movement of the piston 50, and localized high temperatures might therefore result. The lower edge of the groove 95 constitutes in effect a common lower edge for all the exhaust ports, thus insuring that all such ports will open simultaneously irrespective of any variations in their vertical location. Both grooves 95 and 96 lessen the likelihood of contact between the rings on the upper piston 40 and hard scale on the unmachined walls of the exhaust ports. In addition, the upper groove 96 acts as an oil reservoir. The grooves 95 and 96 of course have a width materially less than the width of any piston rings which pass them.

The gear train 20 shown in Fig. 1 as interconnecting the two crank shafts may be employed as a part of a harmonic balancer, the other part of which comprises a second gear train (not shown) at the opposite end of the engine, the latter gear train being usable in the driving of accessories such as a fan, a coolant pump, a blower, and an electric generator. Appropriately located weights of appropriate mass attached to or forming parts of gears of each gear train will counterbalance the vibration forces resulting from the reciprocation of the pistons and oscillation of the piston rods.

In Figs. 15, 16, and 17, I have illustrated another means for providing harmonic balancing. As there shown, the upper and lower crank shafts are provided at corresponding ends with bevel gears 100 and 101 meshing respectively with pinions 102 and 103 fixed on the ends of a vertical shaft 104. An idler bevel gear 105 coaxial with the upper crank shaft meshes with the pinion 102, and hence rotates in the opposite direction to the gear 100. At the opposite end of the upper crank shaft there are mounted coaxially therewith a pair of equal-diameter bevel gears 106 and 107, the former rotatable with the upper crank shaft and the latter independently rotatable. A bevel pinion 108 mounted on a shaft 109 interconnects the two gears 106 and 107. The shaft 109 may be included as an element in means driving accessories. In the arrangement shown in Figs. 15, 16, and 17, balancing weights of appropriate mass are appropriately located in the gears 100, 105, 106, and 107.

Any convenient means may be employed for supplying under pressure the gaseous fluid admitted to the cylinder 31 through the ports 42. Fig. 1 contemplates the use of a Roots-type blower having a housing 110 and discharging into the air box 43 through an opening 111. The specific characteristics set forth above for a particular engine contemplate a nominal compression ratio of between six and fourteen to one, depending on the type of fuel used, and air induction pressure of between 15 and 20 lbs. per square inch absolute. If the induction pressure is increased to produce a denser initial charge and an increased power-output, it becomes necessary to decrease the nominal compression ratio and modify the exhaust events by reducing the extent of exhaust-port opening and increasing the lead of the auxiliary crank shaft 53 to obtain both earlier opening and earlier closing of the exhaust ports.

I claim as my invention:

1. In a two-stroke cycle engine, aligned main and auxiliary cylinders and a combustion chamber between and interconnecting said cylinders, main and auxiliary pistons reciprocable in said cylinders respectively, means for reciprocating said pistons oppositely in timed relation and for causing the auxiliary piston to reciprocate through a stroke materially shorter than that of the main piston, inlet ports in said main cylinder positioned to be uncovered by the main piston near the outer end of its stroke, exhaust ports in said auxiliary cylinder positioned to be uncovered by the auxiliary piston near the outer end of its stroke, and means for supplying gaseous fluid under pressure to said inlet ports, said cylinders having diameters materially greater than the diameter of said combustion chamber.

2. The invention set forth in claim 1 with the addition that the piston-reciprocating means is so constructed and arranged that the auxiliary piston reciprocates with a lead over the main piston.

3. An engine as set forth in claim 1 with the addition of means for causing gaseous fluid entering said main cylinder through said inlet ports to rotate about the cylinder axis.

References Cited in the file of this patent

UNITED STATES PATENTS

| | | |
|---|---|---|
| 1,075,889 | Woolf | Oct. 14, 1913 |
| 1,281,644 | Ostergren | Oct. 15, 1918 |
| 1,464,268 | Keller | Aug. 7, 1923 |
| 1,653,925 | Petter et al. | Dec. 27, 1927 |
| 1,701,538 | Moore | Feb. 12, 1929 |
| 1,701,550 | Woolson | Feb. 12, 1929 |
| 1,819,759 | Valletta | Aug. 18, 1931 |
| 1,857,656 | Oldfield | May 10, 1932 |
| 1,862,970 | Raymond | June 14, 1932 |
| 1,880,025 | Robertson | Sept. 27, 1932 |
| 1,942,571 | Ricardo | Jan. 9, 1934 |
| 1,968,110 | Walker | July 31, 1934 |
| 1,972,409 | Petersen | Sept. 4, 1934 |
| 2,031,318 | Junkers | Feb. 18, 1936 |
| 2,133,842 | Bailey | Oct. 18, 1938 |
| 2,599,908 | Gehrandt | June 10, 1952 |

FOREIGN PATENTS

| | | |
|---|---|---|
| 15,657 | Great Britain | Nov. 5, 1915 |
| 225,249 | Great Britain | 1924 |
| 715,843 | France | 1931 |
| 853,955 | France | 1939 |